United States Patent
Ohtomo et al.

(10) Patent No.: US 11,506,759 B2
(45) Date of Patent: Nov. 22, 2022

(54) SURVEYING INSTRUMENT AND SURVEYING INSTRUMENT SYSTEM

(71) Applicant: TOPCON Corporation, Tokyo-to (JP)

(72) Inventors: Fumio Ohtomo, Saitama (JP); Ikuo Ishinabe, Tokyo-to (JP); Kaoru Kumagai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 1051 days.

(21) Appl. No.: 16/183,017

(22) Filed: Nov. 7, 2018

(65) Prior Publication Data

US 2019/0154805 A1 May 23, 2019

(30) Foreign Application Priority Data

Nov. 17, 2017 (JP) .............................. JP2017-221500

(51) Int. Cl.
| G01S 7/481 | (2006.01) |
| G01S 17/08 | (2006.01) |
| G01S 7/48 | (2006.01) |
| G01S 7/497 | (2006.01) |
| G01S 17/42 | (2006.01) |
| G01S 17/66 | (2006.01) |

(Continued)

(52) U.S. Cl.
CPC .......... *G01S 7/4817* (2013.01); *G01C 15/002* (2013.01); *G01S 7/4808* (2013.01); *G01S 7/4972* (2013.01); *G01S 17/08* (2013.01); *G01S 17/42* (2013.01); *G01S 17/66* (2013.01); *G01S 17/86* (2020.01)

(58) Field of Classification Search
CPC ...... G01S 7/4817; G01S 17/86; G01S 7/4808; G01S 7/4972; G01S 17/08; G01S 17/42; G01S 17/66; G01C 15/002
See application file for complete search history.

(56) References Cited

U.S. PATENT DOCUMENTS

| 2002/0085193 A1 | 7/2002 | Ohtomo et al. |
| 2006/0158423 A1 | 7/2006 | Kern et al. |
(Continued)

FOREIGN PATENT DOCUMENTS

| JP | 2006-503275 A | 1/2006 |
| JP | 4356050 B2 | 11/2009 |
(Continued)

*Primary Examiner* — Yuqing Xiao
*Assistant Examiner* — Benjamin Richard Hebert
(74) *Attorney, Agent, or Firm* — Nields, Lemack & Frame, LLC

(57) ABSTRACT

A distance measuring light projecting module comprises a light receiving module for receiving a reflected distance measuring light and a background light, a distance measuring unit for receiving the reflected distance measuring light and performs a distance measurement, an image pickup module for receiving the background light and for acquiring a background image, an optical axis deflector for integrally deflecting an optical axis of the distance measuring light and an optical axis of the background light, and an arithmetic control module for controlling the optical axis deflector, wherein the optical axis deflector has a rotary driving module for rotating a pair of disk prisms individually, and a projecting direction detecting module for detecting a rotation angle of each of the disk prisms.

12 Claims, 6 Drawing Sheets

(51) Int. Cl.
*G01C 15/00* (2006.01)
*G01S 17/86* (2020.01)

(56) References Cited

U.S. PATENT DOCUMENTS

| | | | |
|---|---|---|---|
| 2011/0032507 A1* | 2/2011 | Braunecker | G01C 15/002 356/5.01 |
| 2014/0226145 A1* | 8/2014 | Steffey | G01S 7/4813 356/4.01 |
| 2015/0116693 A1* | 4/2015 | Ohtomo | G01S 17/42 356/4.01 |
| 2015/0247927 A1* | 9/2015 | Bockem | G01S 17/66 356/3.09 |
| 2016/0238385 A1* | 8/2016 | Ohtomo | G01C 3/08 |
| 2016/0238708 A1 | 8/2016 | Ohtomo et al. | |
| 2016/0259039 A1 | 9/2016 | Ohtomo et al. | |
| 2017/0168142 A1 | 6/2017 | Kumagai et al. | |
| 2017/0227357 A1 | 8/2017 | Ohtomo et al. | |
| 2018/0180890 A1* | 6/2018 | Baerenrodt | G06F 3/013 |
| 2019/0250274 A1* | 8/2019 | Ito | G01S 17/58 |

FOREIGN PATENT DOCUMENTS

| | | | |
|---|---|---|---|
| JP | 2015-507744 A | 3/2015 | |
| JP | 2016-151422 A | 8/2016 | |
| JP | 2016-151423 A | 8/2016 | |
| JP | 2016-161411 A | 9/2016 | |
| JP | 2017-106813 A | 6/2017 | |
| JP | 2017-142081 A | 8/2017 | |
| WO | 2013/101542 A1 | 7/2013 | |
| WO | WO-2018003852 A1 * | 1/2018 | G01S 17/89 |

* cited by examiner

SURVEYING INSTRUMENT AND SURVEYING INSTRUMENT SYSTEM

BACKGROUND OF THE INVENTION

The present invention relates to a surveying instrument with a tracking function and a surveying instrument system.

There is a total station as a surveying instrument with the tracking function. In the total station, an object to be measured is sighted by a telescope with high magnification also serving as a distance measuring optical system, a measurement is performed, and further, the telescope is horizontally rotated/vertically rotated, a different object to be measured is sighted or the like, and the different objects to be measured are sequentially sighted and the measurement is performed, respectively. Alternatively, in the total station, the telescope is horizontally rotated/vertically rotated while following movement of the object to be measured, the object to be measured is sighted while the object to be measured is being tracked, and the measuring is carried out.

However, the magnification of the telescope is high, a field angle is as extremely small as approximately 2°, and further, the telescope itself has a large inertia. Further, since a support mechanism of the telescope requires high rigidity, a support mechanism unit also has a large inertia.

Thus, at a change of the object to be measured, it is difficult to horizontally rotate/vertically rotate the telescope at a high speed and to rapidly sight the object to be measured, and further, if movement of the object to be measured is fast during tracking, the movement cannot be followed but the object to be measured goes out of a visual field of the telescope in some cases. Once the object to be measured goes out of the visual field, since the field angle of the telescope is narrow, it takes time to catch the object to be measured again, which causes deterioration in workability of the measurement.

SUMMARY OF THE INVENTION

It is an object of the present invention to provide a surveying instrument which can sight an object to be measured at a high speed and a surveying instrument system.

To attain the object as described above, a surveying instrument according to the present invention comprises a distance measuring light projecting module for projecting a distance measuring light, a light receiving module for receiving a reflected distance measuring light which is the distance measuring light retro-reflected by an object to be measured and a background light incident coaxially with the reflected distance measuring light, a distance measuring unit for receiving the reflected distance measuring light and performing a distance measurement, an image pickup module for receiving the background light separated from the reflected distance measuring light and acquiring a background image, an optical axis deflector for integrally deflecting an optical axis of the distance measuring light and an optical axis of the background light, and an arithmetic control module for controlling the optical axis deflector, wherein the optical axis deflector has a pair of disk prisms in which two or more prism columns are arrayed in parallel, a rotary driving module for rotating the disk prisms individually, and a projecting direction detecting module for detecting a rotation angle of each of the disk prisms.

Further, in the surveying instrument according to a preferred embodiment, a wavelength of the distance measuring light and a wavelength of the background light are different, and the arithmetic control module corrects an optical axis deviation with respect to a distance measuring optical axis caused by a wavelength characteristic of the optical axis deflector on an image acquired by the image pickup module based on the wavelength characteristic and a detection result of the projecting direction detecting module.

Further, the surveying instrument according to the preferred embodiment comprises a wide-angle image, wherein an optical axis of the wide-angle image pickup module is in parallel with the distance measuring optical axis and has an already-known relationship, and the arithmetic control module indicates a measuring position of a measuring point on the wide-angle image based on a deflection angle of the distance measuring optical axis by the optical axis deflector when measuring the measuring point.

Further, the surveying instrument according to the preferred embodiment comprises a tracking module for irradiating a tracking light with the same optical axis as the distance measuring light, receiving a reflected tracking light from the object to be measured and performing the tracking, wherein the background light includes a wavelength of the tracking light, and the image pickup module and the tracking module are both used at the same time.

Further, in the surveying instrument according to a preferred embodiment, an optical component, which separates the background light from the reflected distance measuring light, separates a wavelength other than the reflected distance measuring light, the background image acquired by the image pickup module is an RGB color image, and an image deviation of the RGB is corrected based on the control information of the optical axis deflector.

Further, a measuring instrument according to the present invention comprises a distance measuring light projecting module for projecting a distance measuring light, a light receiving module for receiving a reflected distance measuring light, which is the distance measuring light retro-reflected by an object to be measured, and a reflected tracking light incident coaxially with the reflected distance measuring light, a distance measuring unit for receiving the reflected distance measuring light and performing a distance measurement, a tracking module for projecting a tracking light with the same optical axis as a distance measuring optical axis, for receiving the reflected tracking light separated from the reflected distance measuring light, for detecting a deviation between the reflected tracking light and the distance measuring optical axis, for calculating the tracking control information based on the deviation and for performing the tracking, an optical axis deflector for integrally deflecting the distance measuring light and the tracking light, and an arithmetic control module for controlling the optical axis deflector and for directing the distance measuring optical axis toward the object to be measured and performing a measurement, wherein the optical axis deflector has a pair of disk prisms in which two or more prism columns is arrayed in parallel, a rotary driving module for rotating the disk prisms individually, and a projecting direction detecting module for detecting a rotation angle of each of the disk prisms, wherein the tracking control information includes a detection result of the projecting direction detecting module, and the optical axis deflector is configured to be controlled based on the tracking control information.

Further, in the surveying instrument according to a preferred embodiment, a wavelength of the distance measuring light and a wavelength of the tracking light are different, and the arithmetic control module is configured to correct an optical axis deviation with respect to the distance measuring optical axis caused by a wavelength characteristic of the optical axis deflector on an image acquired by the tracking module based on the wavelength characteristic and a detection result of the projecting direction detecting module and to perform a tracking based on a correction result.

Further, in the surveying instrument according to a preferred embodiment, the tracking light has a spread larger than a maximum optical axis deviation with respect to the distance measuring optical axis caused by the wavelength characteristic of the optical axis deflector.

Further, a surveying instrument system according to the present invention has one of the aforementioned surveying instruments, a supporting unit for installing the surveying instrument, and an installment base unit which is a support portion of the surveying instrument, wherein the installment base unit has a rotary driving module which rotates/drives the surveying instrument in a horizontal direction and in a vertical direction, and an angle detector which detects a horizontal rotation angle and a vertical rotation angle, and the arithmetic control module is configured to control a rotary driving module of the optical axis deflector and to perform a tracking of an object to be measured and is configured to control the rotary driving module of the installment base unit and the rotary driving module of the optical axis deflector such that a deflection angle of the distance measuring optical axis becomes 0.

According to the present invention, a distance measuring light projecting module for projecting a distance measuring light, a light receiving module for receiving a reflected distance measuring light which is the distance measuring light retro-reflected by an object to be measured and a background light incident coaxially with the reflected distance measuring light, a distance measuring unit for receiving the reflected distance measuring light and performing a distance measurement, an image pickup module for receiving the background light separated from the reflected distance measuring light and acquiring a background image, an optical axis deflector for integrally deflecting an optical axis of the distance measuring light and an optical axis of the background light, and an arithmetic control module for controlling the optical axis deflector are provided, and the optical axis deflector has a pair of disk prisms in which two or more prism columns are arrayed in parallel, a rotary driving module for rotating the disk prisms individually, and a projecting direction detecting module for detecting a rotation angle of each of the disk prisms. As a result, the disk prism which changes the distance measuring optical axis has a light weight, is capable of high-speed rotation and high response, and is capable of rapid response to a change in a sight direction.

Further, according to the present invention, a distance measuring light, a light receiving module for receiving a reflected distance measuring light, which is the distance measuring light retro-reflected by an object to be measured, and a reflected tracking light incident coaxially with the reflected distance measuring light, a distance measuring unit for receiving the reflected distance measuring light and performing a distance measurement, a tracking module for projecting a tracking light with the same optical axis as a distance measuring optical axis, for receiving the reflected tracking light separated from the reflected distance measuring light, for detecting a deviation between the reflected tracking light and the distance measuring optical axis, for calculating the tracking control information based on the deviation and for performing the tracking, an optical axis deflector for integrally deflecting the distance measuring light and the tracking light, and an arithmetic control module for controlling the optical axis deflector and for directing the distance measuring optical axis toward the object to be measured and performing a measurement are provided, and the optical axis deflector has a pair of disk prisms in which two or more prism columns is arrayed in parallel, a rotary driving module for rotating the disk prisms individually, and a projecting direction detecting module for detecting a rotation angle of each of the disk prisms, wherein the tracking control information includes a detection result of the projecting direction detecting module, and the optical axis deflector is configured to be controlled based on the tracking control information. As a result, the disk prism which deflects the distance measuring optical axis has a light weight, is capable of high-speed rotation and high response, and is capable of high-speed and high-responsive tracking.

Furthermore, according to the present invention, a supporting unit for installing the surveying instrument, and an installment base unit which is a support portion of the surveying instrument are provided, and the installment base unit has a rotary driving module which rotates/drives the surveying instrument in a horizontal direction and in a vertical direction, and an angle detector which detects a horizontal rotation angle and a vertical rotation angle, and the arithmetic control module is configured to controls a rotary driving module of the optical axis deflector and to perform a tracking of an object to be measured and is configured to control the rotary driving module of the installment base unit and the rotary driving module of the optical axis deflector such that a deflection angle of the distance measuring optical axis becomes 0. As a result, the disk prism which deflects the distance measuring optical axis has a light weight, is capable of high-speed rotation and high response, is capable of high-speed and high-responsive tracking, and is capable of the tracking at high-speed and at high-response.

DETAILED DESCRIPTION OF THE PREFERRED EMBODIMENT

A description will be given below on an embodiment of the present invention by referring to the attached drawings.

A surveying instrument system according to the embodiment of the present invention will be described by FIG. 1, FIG. 2, and FIG. 3.

Figure 1:
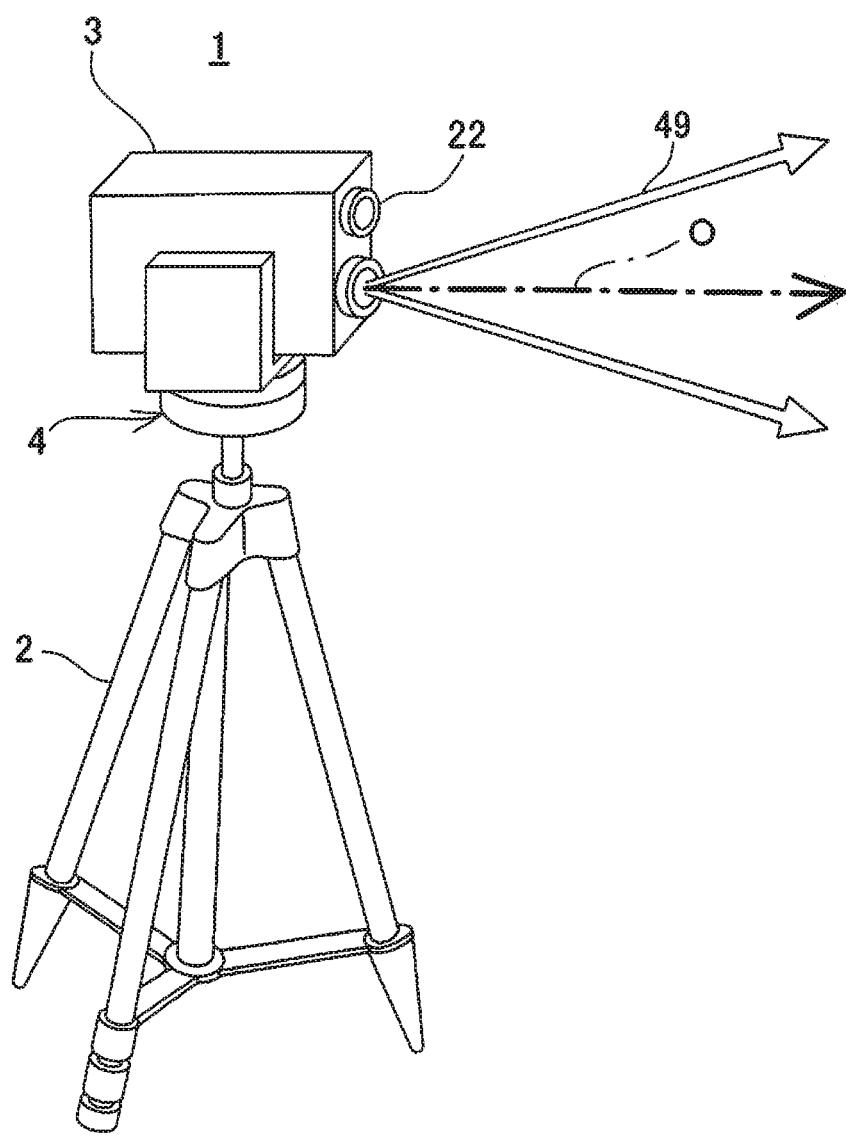
FIG. 1 is an external view of a surveying instrument system according to an embodiment of the present invention.

In FIG. 1, reference numeral 1 denotes a surveying instrument system, reference character O denotes a distance measuring optical axis in a state where an optical axis is not deflected, and the distance measuring optical axis at this time is made a reference optical axis.

The surveying instrument system 1 mainly has a tripod 2 as a supporting unit, a surveying instrument 3 and an installment base unit 4 which is a support portion of the surveying instrument 3.

The installment base unit 4 is mounted on an upper end of the tripod 2, and the surveying instrument 3 is supported by the installment base unit 4 rotatably in an up-and-down direction and in a left-and-right direction, respectively.

Figure 2:
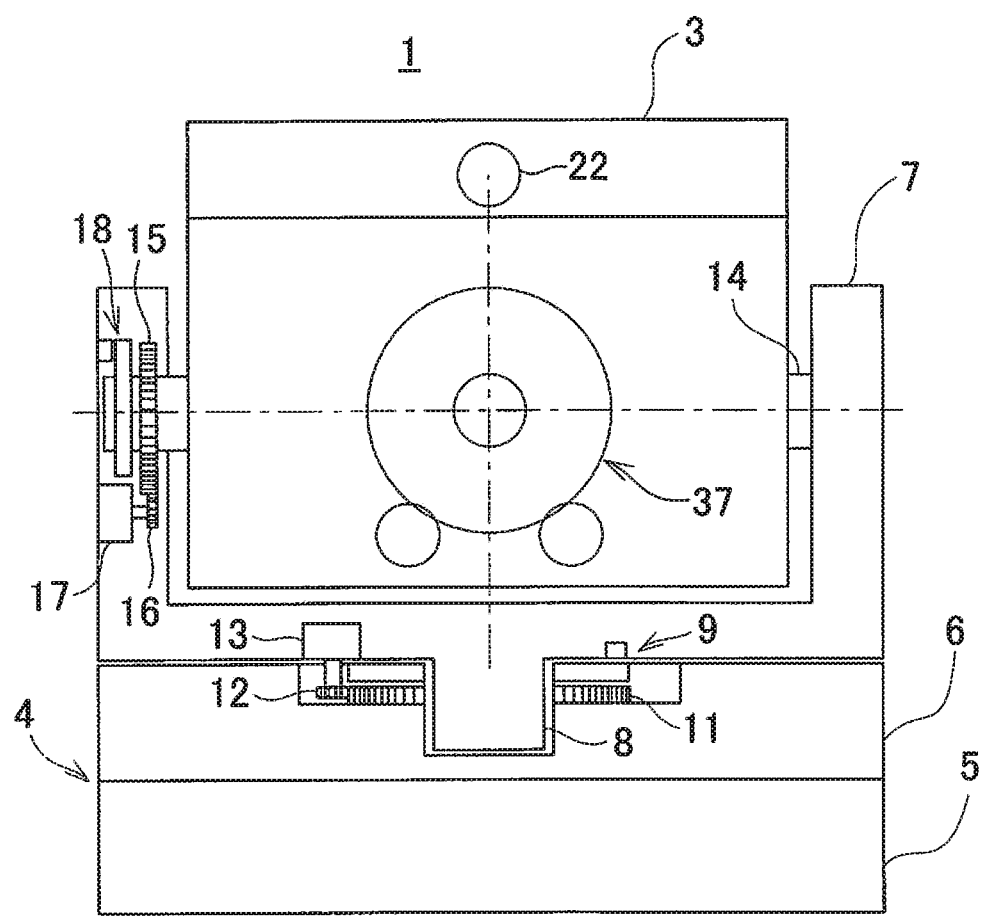
FIG. 2 is a front view of a surveying instrument in the surveying instrument system.

As illustrated in FIG. 2, the installment base unit 4 has a base member 5 fixed to the upper end of the tripod 2, a horizontal base plate 6 mounted by being fixed to the base member 5, and a frame unit 7 provided on the horizontal base plate 6 rotatably in the horizontal direction. The surveying instrument 3 is mounted on the frame unit 7 rotatably in the vertical direction.

A horizontal rotation shaft 8 is projected from a lower surface of the frame unit 7, and the horizontal rotation shaft 8 is rotatably fitted to the horizontal base plate 6 via a bearing (not shown). The frame unit 7 is rotatable in the horizontal direction around the horizontal rotation shaft 8.

Further, a horizontal angle detector 9 (an encoder, for example) which detects a horizontal angle (an angle in a rotating direction around the horizontal rotation shaft 8) is provided between the horizontal rotation shaft 8 and the horizontal base plate 6. A relative rotation angle of the frame unit 7 in the horizontal direction with respect to the horizontal base plate 6 is detected by the horizontal angle detector 9.

A horizontal rotation gear 11 is fixed to the horizontal base plate 6 concentrically with the horizontal rotation shaft 8, and a horizontal pinion gear 12 is meshed with the horizontal rotation gear 11. A horizontal motor 13 as a horizontal rotary driving module is provided on the frame unit 7, and the horizontal pinion gear 12 is fixed to an output shaft of the horizontal motor 13.

The horizontal pinion gear 12 is rotated by driving of the horizontal motor 13, and the horizontal pinion gear 12 revolves around the horizontal rotation gear 11. Further, the horizontal motor 13, the frame unit 7 and the surveying instrument 3 are integrally rotated. Thus, the surveying instrument 3 is rotated by the horizontal motor 13 in the horizontal direction.

The frame unit 7 has a recess shape having a recess portion, and the surveying instrument 3 is accommodated in the recess portion. The surveying instrument 3 is supported by the frame unit 7 via a vertical rotation shaft 14, and the surveying instrument 3 is capable of rotating freely in the vertical direction around the vertical rotation shaft 14.

A vertical rotation gear 15 is fitted and fixed to one end of the vertical rotation shaft 14, and a pinion gear 16 is meshed with the vertical rotation gear 15. The pinion gear 16 is fixed to an output shaft of a vertical motor 17 as a vertical rotary driving module provided on the frame unit 7. When the vertical motor 17 is driven, the pinion gear 16 is rotated, and further, the surveying instrument 3 is rotated in the vertical direction via the vertical rotation gear 15 and the vertical rotation shaft 14.

Further, a vertical angle detector 18 (an encoder, for example) which detects a vertical angle (an angle in the rotating direction around the vertical rotation shaft 14) is provided between the vertical rotation shaft 14 and the frame unit 7. A relative rotation angle of the surveying instrument 3 in the vertical direction with respect to the frame unit 7 is detected by the vertical angle detector 18.

The horizontal motor 13 and the vertical motor 17 are driven by a second motor driver 32 (to be described later) and is driven/controlled by an arithmetic control module 26 (to be described later) as a control module via the second motor driver 32 so that a required rotation amount is obtained at a required timing.

The rotation amount of the horizontal motor 13 (that is, a horizontal angle of the frame unit 7) is detected by the horizontal angle detector 9. The rotation amount of the vertical motor 17 (that is, a vertical angle of the surveying instrument 3) is detected by the vertical angle detector 18.

Thus, the horizontal angle and the vertical angle of the surveying instrument 3 are detected by the horizontal angle detector 9 and the vertical angle detector 18, respectively, and detection results are input into the arithmetic control module 26, respectively. It is to be noted that a rotary driving module is configured by the horizontal motor 13 and the vertical motor 17.

The angle detector which detects the vertical rotation angle and the horizontal rotation angle of the surveying instrument 3, that is, the directional angle detector is configured by the horizontal angle detector 9 and the vertical angle detector 18.

Figure 3:
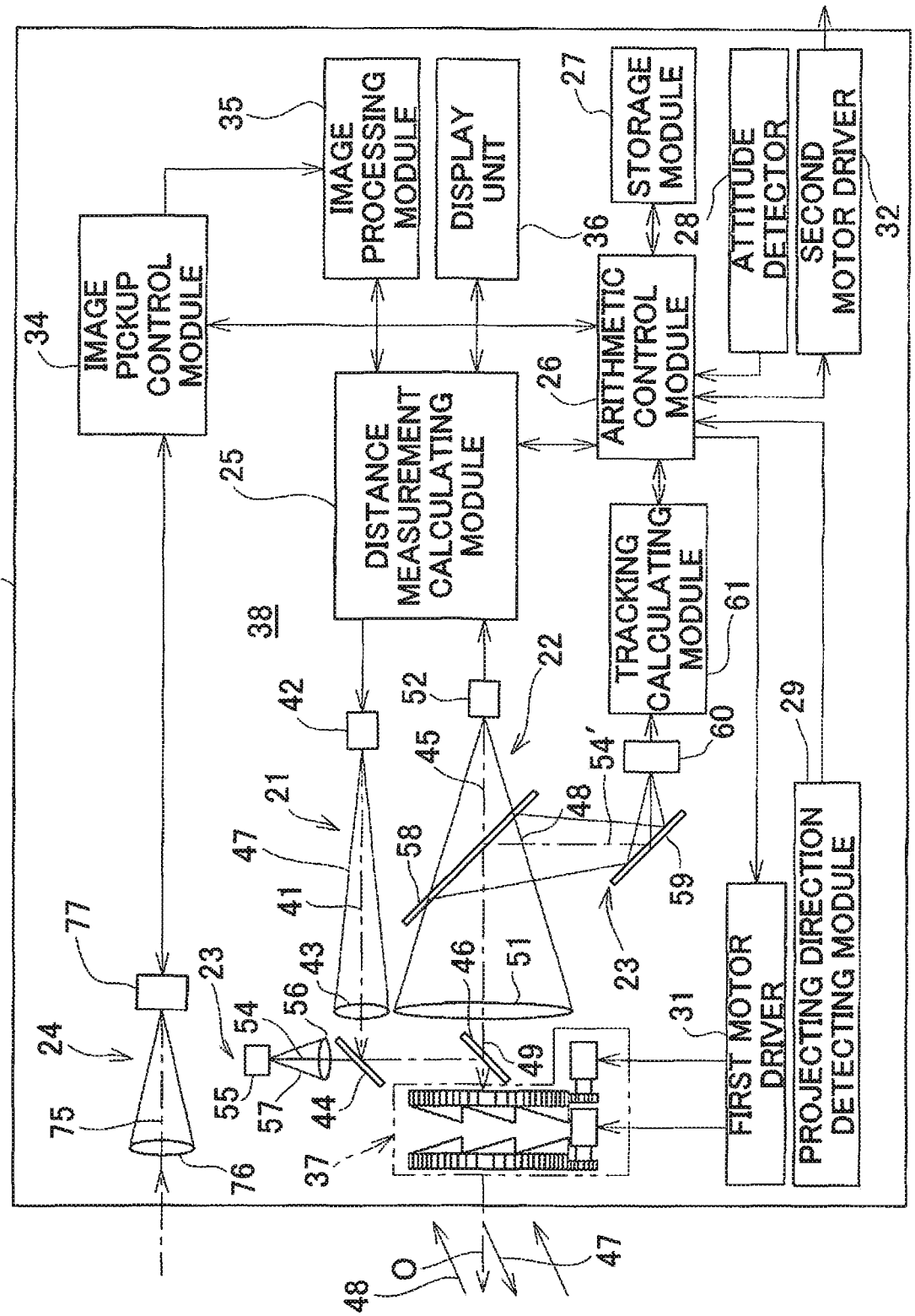
FIG. 3 is a schematic block diagram of the surveying instrument.
Figure 4:
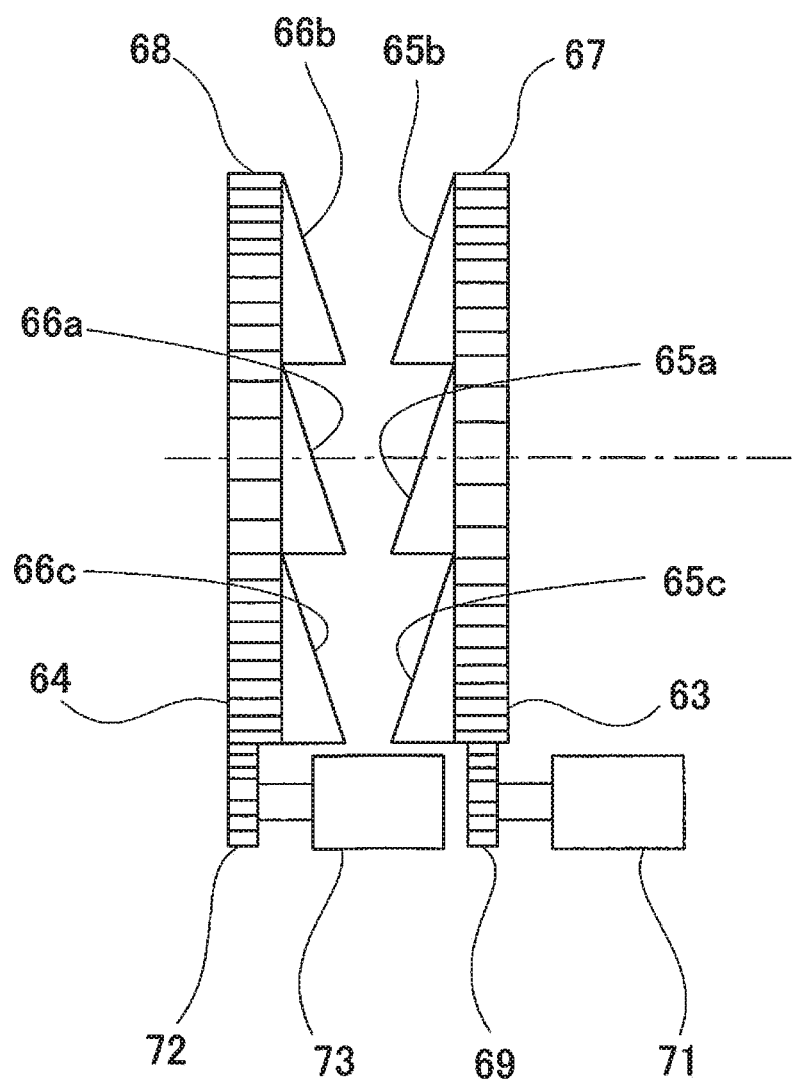
FIG. 4 is an enlarged view of an essential part of an optical axis deflector in the surveying instrument.

The surveying instrument 3 will be further described by referring FIG. 3 and FIG. 4.

The surveying instrument 3 mainly includes a distance measuring light projecting module 21, a light receiving module 22, a tracking module 23, a wide-angle image pickup module 24, a distance measurement calculating module 25, the arithmetic control module 26, a storage module 27, an attitude detector 28, a projecting direction detecting module 29, a first motor driver 31, the second motor driver 32, an image pickup control module 34, an image processing module 35, a display unit 36, and an optical axis deflector 37, and they are accommodated in a casing 40 and integrated. It is to be noted that the distance measuring light projecting module 21, the light receiving module 22, the distance measurement calculating module 25, the optical axis deflector 37 and the like make up a distance measuring unit 38 which functions as an electronic distance meter.

As the arithmetic control module 26, a general-purpose CPU or a CPU specialized for this instrument is used. Further, as the storage module 27, a magnetic storage medium such as an HDD, an optical storage medium such as a CD, a semiconductor memory such as a memory card are used.

The attitude detector 28 detects a tilt of the surveying instrument 3 to the horizontal or to the vertical, and a detection result is inputted into the arithmetic control module 26. Further, as the attitude detector 28, a tilt detector such as a tilt sensor is used and further, an attitude detector disclosed in Japanese Patent Laid-Open No. 2017-106813 can be used. An attitude detector in Japanese Patent Laid-Open No. 2017-106813 can detect a tilt of 360° or more in all the directions in real time.

The distance measuring light projecting module 21 has a projection optical axis 41, and a light emitter 42 such as a laser diode (LD), for example, is provided on the projection optical axis 41. Further, a projecting lens 43 is provided on the projection optical axis 41. Further, the projection optical axis 41 is deflected by a beam splitter 44 as a deflecting optical component provided on the projection optical axis 41 and a reflection mirror 46 as the deflecting optical component provided on a light receiving optical axis 45 (to be described later) so as to match the light receiving optical axis 45. The beam splitter 44 has an optical characteristic which reflects a distance measuring light 47 and transmits a light with a wavelength other than the distance measuring light 47. The beam splitter 44 and the reflection mirror 46 make up a projection optical axis deflector.

The light emitter 42 pulse-emits a laser beam or burst-emits a laser beam. The distance measuring light projecting module 21 projects a pulsed laser beam (or a burst-emitted laser beam) emitted from the light emitter 42 as the distance measuring light 47. It is to be noted that the burst-emission is described in Japanese Patent Laid-Open No. 2016-161411.

A description will be given on the light receiving module 22. As the light receiving module 22, a photodiode (PD) or an avalanche photodiode (APD) is used. To the light receiving module 22, a reflected distance measuring light 48 is incident from the object to be measured. The light receiving module 22 has the light receiving optical axis 45. The projection optical axis 41 deflected by the beam splitter 44 and the reflection mirror 46 coincides with the light receiving optical axis 45.

It is to be noted that a state where the projection optical axis 41 coincides with the light receiving optical axis 45 is referred to as a distance measuring optical axis 49 (see FIG. 1).

The optical axis deflector 37 is disposed on the distance measuring optical axis 49. A straight optical axis transmitted through a center of the optical axis deflector 37 is the reference optical axis O. The reference optical axis O coincides with the projection optical-axis 41, the light receiving optical axis 45, a tracking optical axis (to be described later) and the distance measuring optical axis 49 when these axes are not deflected by the optical axis deflector 37.

The reflected distance measuring light 48 transmits through the optical axis deflector 37 and is incident onto the light receiving optical axis 45. Further, a focusing lens 51 is disposed on the light receiving optical axis 45. Further, a photodetector 52 such as a photodiode (PD) or an avalanche photodiode (APD), for example, is provided on the light receiving optical axis 45. The focusing lens 51 focuses the reflected distance measuring light 48 on the photodetector 52. The photodetector 52 receives the reflected distance measuring light 48 and produces a light receiving signal. The light receiving signal is inputted into the distance measurement calculating module 25, and the distance measurement calculating module 25 performs the distance measurement to the object to be measured based on the light receiving signal.

A description will be given on the tracking module 23. The tracking module 23 has a tracking optical axis 54, and the tracking optical axis 54 is transmitted through the beam splitter 44 and coincides with the projection optical axis 41.

A tracking light source 55 and a projecting lens 56 are provided on the tracking optical axis 54, and a tracking light 57 emitted from the tracking light source 55 is a visible light or an invisible light, and the tracing light 57 has a wavelength different from that of the distance measuring light 47 and is transmitted through the beam splitter 44. The tracking light 57 transmitting through the beam splitter 44 is deflected by the reflection mirror 46 so as to coincides with the distance measuring optical axis 49 and is projected through the optical axis deflector 37. Therefore, the optical axis of the tracking light projected from the surveying instrument 3 is the same optical axis as the distance measuring optical axis 49.

A beam splitter 58 as a deflecting optical component is provided on the light receiving optical axis 45 transmitting through the optical axis deflector 37. The beam splitter 58 has an optical characteristic which transmits only the distance measuring light and reflects the tracking light or a light beam with a wavelength other than the distance measuring light and is a wavelength selection optical component which separates the distance measuring light and the tracking light.

A tracking light receiving optical axis 54', which branches from the light receiving optical axis 45 by the beam splitter 58 and, is deflected is directed by a reflection mirror 59 toward a tracking photodetector 60.

The tracking photodetector 60 receives a reflected tracking light reflected by the object to be measured and produces a light receiving signal, and the light receiving signal is inputted into a tracking calculating module 61. The tracking calculating module 61 calculates a tracking control information required for a tracking based on a light receiving position of the reflected tracking light on the tracking photodetector 60.

It is to be noted that the tracking control information is an information in order to calculate a positional deviation and a direction of the deviation between the tracking light receiving optical axis 54' and the light receiving position on the tracking photodetector 60 and to coincide the position of the light receiving position with the tracking light receiving optical axis 54', for example. The tracking control information includes the control information of the optical axis deflector 37 which controls a rotation amount and a rotating direction of each of disk prisms 63 and 64 (to be described later) based on calculation results of the positional deviation of the light receiving position and the direction of the deviation.

The tracking calculating module 61 inputs the tracking control information into the arithmetic control module 26. The arithmetic control module 26 controls the optical axis deflector 37 based on the tracking control signal and performs the tracking. It is to be noted that the tracking calculating module 61 may control the optical axis deflector 37 based on the tracking control signal and perform the tracking. As the tracking calculating module 61, a general CPU or a CPU specialized for the tracking is used.

It is to be noted that as the tracking light source 55, a laser diode (LD), for example, may be used, or a light beam as emitted from the laser diode is led by an optical fiber, and a projection end surface of the optical fiber may be made a tracking light source.

It is to be noted that, though not illustrated in FIG. 3, the light receiving optical axis 45 or the tracking light receiving optical axis 54' is branched, a focusing lens (not shown) and an image pickup element (not shown) are disposed on the branched optical axis, and a narrow-angle image pickup module (not shown) may be provided.

Further, into the tracking module 23, the background light including the object to be measured is incident together with the tracking light. The tracking photodetector 60 receives the background light together with the tracking light, and a background image including the object to be measured is obtained. Therefore, the tracking module 23, the tracking photodetector 60 and the like also function as the narrow-angle image pickup module which acquires a background image of the object to be measured. The optical axis of the background light coincides with the optical axis of the tracking light, and the optical axis of the background light is deflected by the optical light deflector 37 integrally with the optical axis of the distance measuring light.

Thus, the tracking module 23 doubles as the narrow-angle image pickup module, an image acquired from the tracking photodetector 60 is acquired as a narrow-angle image, and the narrow-angle image may be acquired as a background image at a sighted position of the distance measuring optical axis 49.

It is to be noted that, when the beam splitter 58 reflects only the tracking light, the background image becomes a monochrome image, and when the beam splitter 58 reflects a light having a wavelength other than the distance measuring light, the background image becomes a color image.

Further, when the tracking module 23 is used also as the narrow-angle image pickup module, in a state where the tracking is being performed, the tracking light source 55 is lighted, and the tracking light is irradiated. The tracking photodetector 60 receives the background light together with the reflected tracking light. Therefore, the tracking module 23 can obtain an image for tracking in a tracking state. Furthermore, in a state where the tracking is not performed, the tracking light source 55 is turned off, and the background light at the sighted position may be received by the tracking photodetector 60. In this case, the tracking module 23 acts only as the narrow-angle image pickup module and acquires a narrow-angle background image in a sight direction (a direction of the distance measuring optical axis).

An optical system configured by the tracking module 23 and the light receiving module 22 and the like corresponds to a tracking system of a conventional total station. Therefore, a field angle of the narrow-angle image pickup module which picks up an image through the optical system is as narrow as approximately 3°, and the image as acquired is an image in a narrow and small image of the measuring point and of the vicinity of the measuring point. It is to be noted that since the magnification is high, the image itself is an enlarged image of the vicinity of the measuring point.

The optical axis deflector 37 will be described by referring to FIG. 4.

The optical axis deflector 37 is configured by a pair of the disk prisms 63 and 64. Each of the disk prisms 63 and 64 has a disk shape with the same diameter and is disposed on the light receiving optical axis 45 concentrically by crossing the light receiving optical axis 45 at a right angle. Further, the disk prisms 63 and 64 are arranged in parallel at a predetermined interval. The disk prism 63 is formed by an optical glass and has two or more prism columns (three rod-shaped triangular prisms, for example, and hereinafter referred to as triangular prisms) 65a, 65b, and 65c arranged in parallel. Similarly, the disk prism 64 is formed by an optical glass and has three prism columns (rod-shaped triangular prisms, for example, and hereinafter referred to as triangular prisms) 66a, 66b, and 66c arranged in parallel. It is to be noted that all the triangular prisms 65a, 65b, and 65c and the triangular prisms 66a, 66b, and 66c have optical characteristics of a same deflection angle.

It is to be noted that a width of each of the triangular prisms 65a and 66a positioned at a center is larger than a beam diameter of the distance measuring light 47, and the distance measuring light 47 is configured to be transmitted through the triangular prisms 65a and 66a.

A center part (the triangular prisms 65a and 66a) of the optical axis deflector 37 is a distance measuring light deflector as a first optical axis deflector, through which the distance measuring light 47 is transmitted and is projected. A portion excluding the center part of the optical axis deflector 37 (both end portions of the triangular prisms 65a and 66a and the triangular prisms 65b and 65c, and the triangular prisms 66b and 66c) is a reflected distance measuring light deflector as a second optical axis deflector, through which the reflected distance measuring light 48 is transmitted and is incident.

Each of the disk prisms 63 and 64 is disposed independently and individually rotatably around the light receiving optical axis 45. By independently controlling a rotating direction, a rotating amount and a rotating speed, the disk prisms 63 and 64 deflect the projection optical axis 41 of the projected distance measuring light 47 to an arbitrary direction and deflect the light receiving optical axis 45 of the received reflected distance measuring light 48 in parallel with the projection optical axis 41.

An outer shape of the disk prisms 63 and 64 are circular with the light receiving optical axis 45 (reference optical axis O) as the center. Further, by considering the spread of the reflected distance measuring light 48, a diameter of each of the disk prisms 63 and 64 is set so that a sufficient light amount can be obtained.

A ring gear 67 is fitted with an outer periphery of the disk prism 63, and a ring gear 68 is fitted with an outer periphery of the disk prism 64.

A driving gear 69 is meshed with the ring gear 67, and the driving gear 69 is fixed to an output shaft of a motor 71. Similarly, a driving gear 72 is meshed with the ring gear 68, and the driving gear 72 is fixed to an output shaft of a motor 73. The motors 71 and 73 are electrically connected to the first motor driver 31.

As the motors 71 and 73, a motor capable of detecting a rotation angle or a motor rotating correspondingly to a drive input value such as a pulse motor, for example, is used. Alternatively, rotation amounts of the motors 71 and 73 may be detected by using a rotation angle detector which detects a rotation amount (rotation angle) of the motor such as an encoder, for example. The rotation amounts of the motors 71 and 73 are detected, respectively, and the arithmetic control module 26 individually controls the motors 71 and 73 through the first motor driver 31. It is to be noted that, with regard to the detection of the rotation amount and the rotation angle, the encoder is mounted directly on the ring gears 67 and 68, and the rotation angles of the ring gears 67 and 68 may be directly detected.

The driving gears 69 and 72 and the motors 71 and 73 are provided at positions not interfering with the other configuration modules such as the distance measuring light projecting module 21 or the like such as on lower sides of the ring gears 67 and 68, for example.

The projecting lens 43, the beam splitter 41, the reflection mirror 46, the distance measuring light deflector and the like make up a distance measuring projection optical system. Further, the projecting lens 56, the reflection mirror 46, the distance measuring deflector, and the like make up a tracking projection optical system, and the tracking optical-axis 54 as deflected by the reflection mirror 46 coincides with the distance measuring optical axis 19. Further, the reflected distance measuring light deflector, the focusing lens 51 and the like make up a light receiving optical system.

The distance measurement calculating module 25 controls the light emitter 42 and causes the light emitter 42 to perform pulse-emission or burst-emission (intermittent emission) of the laser beam as the distance measuring light 47. The projection optical axis 41 is deflected by the triangular prisms 65a and 66a (distance measuring light deflector) in such a manner that the distance measuring light 47 is directed toward the object to be measured. The distance measurement is performed in a state where the distance measuring optical axis 49 sights the object to be measured.

The reflected distance measuring light 48 reflected from the object to be measured is incident through the triangular prisms 65b and 65c, the triangular prisms 66b and 66c (reflected distance measuring light deflector) and the focusing lens 51, and is received by the photodetector 52. The photodetector 52 sends out a light receiving signal to the distance measurement calculating module 25. The distance measurement calculating module 25 performs the distance measurement of the measuring point (a point irradiated with the distance measuring light) for each pulsed light based on the light receiving signal from the photodetector 52, and the distance measurement data is stored in the storage module 27.

The projecting direction detecting module 29 counts drive pulses inputted into the motors 71 and 73 and detects the rotation angles of the motors 71 and 73. Alternatively, the projecting direction detecting module 29 detects the rotation angles of the motors 71 and 73 based on a signal from the encoder. Further, the projecting direction detecting module 29 calculates the rotation positions of the disk prisms 63 and 64 based on the rotation angles of the motors 71 and 73. Further, the projecting direction detecting module 29 calculates the deflection angle and the projection direction (deflecting direction) of the distance measuring light 47 with respect to the reference optical axis O for each pulsed light based on the refractive indexes and the rotation positions of the disk prisms 63 and 64. A calculation result (angle measurement result) is associated with the distance measurement result and is inputted into the arithmetic control module 26. It is to be noted that when the distance measuring light 47 is burst-emitted, the distance measurement is performed for each intermittent distance measuring light.

By controlling the rotation amount and the rotating direction of each of the motors 71 and 73, the arithmetic control module 26 is capable of controlling the deflection amount and the deflecting direction of the distance measuring optical axis 49 by the optical axis deflector 37. Further, by controlling the rotating direction and the rotation speed of each of the motors 71 and 73 and a rotation ratio between the motors 71 and 73, the arithmetic control module 26 is capable of dynamically controlling the deflecting action by the optical axis deflector 37 and causing the distance measuring optical axis 49 to scan in an arbitrary direction and with an arbitrary pattern.

FIG. 4 illustrates a state where the triangular prisms 65a and 66a and the triangular prisms 65b, 65c, 66b, and 66c are positioned in the same direction, and a maximum deflection angle (±20°, for example) is obtained in this state.

Further, a minimum deflection angle is obtained at a position where either one of the disk prisms 63 and 64 is rotated by 180°, mutual optical actions of the disk prisms 63 and 64 are offset, and the deflection angle becomes 0°. Therefore, the optical axis (the distance measuring optical axis 49) of the pulsed laser beam projected and received through the disk prisms 63 and 64 coincides with the reference optical axis O.

The distance measuring light 47 is emitted from the light emitter 42. The distance measuring light 47 is made a parallel flux by the projecting lens 43, is transmitted through the distance measuring light deflector (the triangular prisms 65a and 66a) and is projected toward the object to be measured. Here, by transmitting through the distance measuring light deflector, the distance measuring light 47 is deflected by the triangular prisms 65a and 66a to a required direction and is projected.

The reflected distance measuring light 48 as reflected by the object to be measured transmits through the reflected distance measuring light deflector and is incident and is focused by the focusing lens 51 on the photodetector 52.

When the reflected distance measuring light 48 transmits through the reflected distance measuring light deflector, the optical axis of the reflected distance measuring light 48 is deflected by the triangular prisms 65b and 65c and the triangular prisms 66b and 66c so as to coincide with the light receiving optical axis 45.

It is possible to arbitrarily change the deflecting direction and the deflection angle of the distance measuring light 47, as projected, by combining the rotation position of the disk prism 63 and the rotation position of the disk prism 64.

Further, in a state where the positional relationship between the disk prism 63 and the disk prism 64 is fixed (that is, in a state where the deflection angle obtained by the disk prism 63 and the disk prism 64 is fixed), the disk prism 63 and the disk prism 64 are rotated integrally by the motors 71 and 73. In this case, a locus drawn by the distance measuring light 47, which transmits through the distance measuring light deflector, forms a circle with the reference optical axis O as the center.

The arithmetic control module 26 calculates the horizontal angle and the vertical angle of the measuring point with respect to the reference optical axis from the deflection angle and the projecting direction of the distance measuring light 47, that is, from the detection result of the projecting direction detecting module 29. Further, the arithmetic control module 26 is capable of acquiring the three-dimensional data of the object to be measured by associating the horizontal angle and the vertical angle on the measuring point with the distance measurement data.

Furthermore, in a case where a direction angle exceeding a maximum deflection angle of the optical axis deflector 37 is required, the arithmetic control module 26 controls the horizontal motor 13 and the vertical motor 17 via the second motor driver 32 and projects the distance measuring light 47 on the measuring point.

In this case, an actual horizontal angle and vertical angle (a horizontal angle and a vertical angle to the horizontal (or the vertical)) of the measuring point, are acquired based on the horizontal angle and the vertical angle of the measuring point with respect to the reference optical axis O and based on the horizontal angle and the vertical angle of the reference optical axis O with respect to the horizontal (or the vertical) detected by the horizontal angle detector 9 and the vertical angle detector 18. Further, the arithmetic control module 26 is capable of associating the actual horizontal angle and vertical angle to the distance measurement data and hence acquiring the three-dimensional data of the object to be measured.

Thus, the surveying instrument 3 functions as a total station.

The wide-angle image pickup module 24 has an image pickup optical axis 75 in parallel with the reference optical axis O of the surveying instrument 3 and an image pickup lens 76 arranged on the image pickup optical axis 75. The wide-angle image pickup module 24 is a camera which has a field angle substantially equal to the maximum deflection angle (±20°, for example) of the disk prisms 63 and 64 or has a field angle larger than the maximum deflection angle of the disk prisms 63 and 64 such as 50 to 60°, for example. The wide-angle image pickup module 24 acquires the image data including a maximum deflection range by the optical axis deflector 37.

The relationship between the image pickup optical axis 75, the projection optical axis 41 and the reference optical axis O is known. That is, the image pickup optical axis 75 is in parallel with the projection optical axis 41 and the reference optical axis O, and moreover, a distance among each of the optical axes is a known value. Further, the wide angle image pickup module 24 is capable of acquiring a video image or a continuous image.

As the image pickup control module 34, a general-purpose CPU or a CPU specialized for this instrument is used, or a part of the functions of the arithmetic control module 26 may be assigned as the image pickup control module 34. The image pickup control module 34 controls the image pickup of the wide-angle image pickup module 24. In a case where the wide-angle image pickup module 24 picks up the video image or the continuous images, the image pickup control module 34 synchronizes a timing when the wide-angle image pickup module 24 picks up a frame image configuring the video image or the continuous images, with a timing (the timing of the distance measurement for each pulsed laser beam) when the surveying instrument performs a measurement, further in a case where the narrow-angle image pickup module (not shown) acquires an image, the image pickup control module 34 also synchronizes with a timing when the narrow-angle image pickup module acquires an image. The arithmetic control module 26 also performs association between the image and the measurement data (the distance measurement data, the angle measurement data). It is to be noted that the arithmetic control module 26 may synchronize the image pickup timing of the wide-angle image pickup module 24, the distance measuring timing of the surveying instrument 3, and the image pickup timing of the narrow-angle image pickup module.

An image pickup element 77 of the wide-angle image pickup module 24 is a CCD or a CMOS sensor which is an aggregate of pixels, and a position on an image element of each pixel can be specified. For example, each pixel has a pixel coordinate in a coordinate system having the image pickup optical axis 75 as an origin, and the position on the image element is specified by the pixel coordinate. Further, a signal from each pixel includes the information of the pixel coordinate together with the light receiving signal.

Further, the image pickup optical axis 75 of the wide-angle image pickup module 24 is in parallel with the reference optical axis O and further, the relationship between the image pickup optical axis 75 and the reference optical axis O is known and thus, when the position on the image pickup element 77 is specified, the deflection angle with respect to the reference optical axis O can be detected for the specified position.

The image processing module 35 executes the image processing such as the edge extraction processing, the extraction of a feature point, the detection of an object to be measured, the image tracking processing, the image matching and the like for the image data as obtained by the wide-angle image pickup module 24 and further, creates gray-scaled image from the image data.

The display unit 36 displays an image obtained by the wide-angle image pickup module 24 or displays the image obtained by the narrow-angle image pickup module. Further, the display unit 36 divides a display screen and displays a wide-angle image obtained by the wide-angle image pickup module 24 on a part and displays a narrow-angle image obtained by the narrow-angle image pickup module on another part in an enlarged manner.

Alternatively, the display unit 36 superposes the narrow-angle image on the wide-angle image and displays it. Further, a display position of the narrow-angle image in the wide-angle image shall be a position where a directional angle of the narrow-angle image (that is, a directional angle of the distance measuring optical axis 49) coincides with the directional angle in the wide-angle image. By superposing the narrow-angle image on the wide-angle image, what position in the object to be measured is measured can be easily recognized.

As a method for superposing the narrow-angle image on the wide-angle image and displaying it, various methods are employed such that the wide-angle image and the narrow-angle image are displayed with the same magnification, a position where the narrow-angle image is displayed by dots or a symbol such as an arrow and the like are employed.

Further, the display unit 36 displays measurement states, the measurement data, and the like. The display unit 36 is made a touch panel and functions also as an operation unit. Further, the display unit 36 having a touch panel function may be detachable with respect to the surveying instrument 3, and a remote control by the display unit 36 may be enabled.

In the storage module 27, various types of programs are stored. These programs include: a program for controlling a light emission timing of the light emitter 42, a program for controlling a rotation of the optical axis deflector 37, a program for performing a distance measurement based on the light receiving timing of the reflected distance measuring light 48, respectively, a program for performing the angle measurement based on the refractive indexes and the rotation positions of the disk prisms 63 and 64, respectively, a program for calculating the three-dimensional data of a surface to be measured based on the distance measurement result and the angle measurement result, a program for controlling the image pickup by the wide-angle image pickup module 24, a program for detecting an attitude of the surveying instrument 3 based on the detection result of the attitude detector 28, a program for creating an image with the three-dimensional data in which the three-dimensional coordinate is given to each pixel based on the measurement data (the distance measurement data and the angle measurement data) and the image and the like are stored.

Each of the programs stored in the storage module 27 is executed or developed by the arithmetic control module 26 and the like, and the various processing is executed.

A description will be given below on operation of the surveying instrument system 1 according to the embodiment.

The surveying instrument 3 is installed at a known point (a point of which the three-dimensional coordinate is already-known) via the tripod 2.

The surveying instrument 3 has the attitude detector 28, and the installment attitude (the tilt) of the surveying instrument 3 with respect to the horizontal can be detected by the attitude detector 28 and thus, a leveling operation of the surveying instrument 3 is not needed. An accurate measurement result can be obtained by correcting the measurement result by a detected tilt.

The reference optical axis O is directed to the object to be measured (measuring point).

As the method of directing the reference optical axis O to the object to be measured (measuring point), the distance measuring optical axis 49 is coincided with the reference optical axis O, that is, in a state where the distance measuring optical axis 49 is not deflected by the optical axis deflector 37, the reference optical axis O is sighted to the object to be measured. The sighted state is checked by an operator according to an image which is displayed on the display unit 36 and which is picked up by the narrow-angle image pickup module. (In the following description, a case where the tracking module 23 is used also as the narrow-angle image pickup module will be described.)

Alternatively, the wide-angle image pickup module 24 is directed to the object to be measured, a wide-angle image including the object to be measured is obtained, and the wide-angle image is displayed on the display unit 36. Further, the narrow-angle image obtained by the narrow-angle image pickup module (the tracking module 23) is superposed on the wide-angle image and displayed on the display unit 36, the deflection by the optical axis deflector 37 is adjusted, and a center of the narrow-angle image (a sight position of the distance measuring light 47) is coincided with the object to be measured in the wide-angle image. In this case, the deflection angle of the distance measuring light 47 (that is, the rotation angles of the disk prisms 63 and 64), when the distance measuring light 47 is sighted, is also obtained.

It is to be noted that, as a method of operating the optical axis deflector 37 and to finally sight the distance measuring optical axis 49 to the measuring point, the operator may manually perform sighting while checking the display on the display unit 36. Alternatively, the image processing module 35 detects the object to be measured, and the arithmetic control module 26 may perform sighting automatically based on the detection result.

At a time when the distance measuring optical axis 49 is sighted on a measuring point, a distance measurement is performed, and the directional angle of the distance measuring optical axis 49 at the distance measurement is calculated based on detected results of the horizontal angle detector 9, and the vertical angle detector 18, and the rotation angles of the disk prisms 63 and 64, and the three-dimensional coordinate of the measuring point is determined by the distance measurement value and the directional angle.

It is to be noted that when the surveying instrument 3 is tilted with respect to the horizontal, the tilt angle is detected by the attitude detector 28, and the measured three-dimensional coordinate is corrected based on the tilt angle.

When there is a plurality of the measuring points, the distance measuring optical axis 19 is sequentially sighted on the measuring point, and the measurement is performed.

The measurement result of the measuring point is associated with the measuring point and stored in the storage module 27.

Next, a description will be given on a case where the measurement is performed while tracking the object to be measured such as setting by referring to FIG. 3, FIG. 4, and FIG. 5. Here, the object to be measured is an optical component with retro-reflectivity such as a prism, and the measuring point is indicated by the object to be measured.

In a state where the object to be measured is caught by the wide-angle image pickup module 24, the distance measuring optical axis 49 is sighted on the object to be measured. It is to be noted that at this time, the reference optical axis O and the distance measuring optical axis 49 may coincide each other or may not coincide.

The tracking light source 55 is lighted, the tracking light is irradiated to the object to be measured and the tracking is started. The reflected tracking light from the object to be measured is transmitted through the optical axis deflector 37 and further, is reflected by the beam splitter 58. Further, the reflected tracking light from the object to be measured is reflected by the reflection mirror 59 and is received by the tracking photodetector 60. The light receiving signal from the tracking photodetector 60 is inputted into the tracking calculating module 61. The tracking calculating module 61 calculates the light receiving position on the tracking photodetector 60 from the light receiving signal and determines a tracking state.

The tracking calculating module 61 judges that the distance measuring optical axis 49 accurately tracks the object to be measured when the position of the reflected tracking light on the tracking photodetector 60 coincide with the reference position, for instance, the position of the tracking light receiving optical axis 54'. Further, the tracking calculating module 61 controls the optical axis deflector 37 so that the light receiving position of the reflected tracking light becomes the reference position. That is, the tracking calculating module 61 controls the rotation directions and the rotation amounts of the disk prisms 63 and 64 of the optical axis deflector 37, controls the deflection angle and the deflection direction of the distance measuring optical axis 49 and performs the tracking of the object to be measured.

It is to be noted that the tracking calculating module 61 may calculate the light receiving position of the reflected tracking light and output the calculation result to the arithmetic control module 26, and the arithmetic control module 26 may control the optical axis deflector 37 and control the tracking.

In the tracking operation, the deflection of the distance measuring optical axis 19 is caused by the rotation of each of the disk prism 63 and the disk prism 64. The disk prisms 63 and 64 are small-sized and light-weighted and can be rotated by the motors 71 and 73 at a high speed or with high responsiveness.

Therefore, an improvement of the responsiveness of the tracking operation and a speed-up of a tracking speed can be realized, and a trackability is improved with respect to the object to be measured moving at a high speed.

The projecting direction detecting module 29 calculates the deflection angle of the distance measuring optical axis 49 with respect to the reference optical axis O based on the detection results of the rotation amounts and the rotating directions of the disk prisms 63 and 64 and the projecting direction detecting module 29 outputs the calculation result to the arithmetic control module 26.

The arithmetic control module 26 drives the horizontal motor 13 and the vertical motor 17 and rotates the surveying instrument 3 in the horizontal direction and/or in the vertical direction so that the deflection angle with respect to the reference optical axis O becomes 0 based on the calculation result of the projecting direction detecting module 29.

Therefore, a tracking can be performed even if the object to be measured moves beyond the maximum deflection angle of the optical axis deflector 37, that is, in a range on the entire periphery of 360° and further, in upper and lower ranges beyond the maximum deflection angle. It is to be noted that the rotation responsiveness, the horizontal rotation speed, and the vertical rotation speed of the surveying instrument 3 cannot be considered to be fast, but since the optical axis deflector 37 follows-up at a high speed, there is no problem with the trackability in the follow-up extending to the range exceeding the maximum deflection angle of the optical axis deflector 37.

It is to be noted that in a case where the movement of the object to be measured is slow, that is, in a case where the surveying instrument 3 can follow the movement of the object to be measured, the tracking is performed in a state where the reference optical axis O and the distance measuring optical axis 49 coincide each other.

Further, in a case where the distance measurement is performed in a state where the reference optical axis O and the distance measuring optical axis 49 are deviated from each other, the directional angle of the object to be measured with respect to the installment position of the surveying instrument 3 is calculated based on the deflection angle and the direction of the distance measuring optical axis 49 acquired by the relative angle and the relative rotating direction between the disk prisms 63 and 64 and based on the horizontal angle and the vertical angle detected by the horizontal angle detector 9 and the vertical angle detector 18.

The three-dimensional coordinates of the measuring point with reference to the installment point of the surveying instrument 3 is determined based on the directional angle and the distance measurement result of the object to be measured with respect to the installment position.

When there are two or more measuring points, the three-dimensional coordinates of each of the measuring points is stored in the storage module 27. Further, the arithmetic control module 26 can superpose each of the measuring points on the wide-angle image as obtained by the wide-angle image pickup module 24 and display the measuring points based on the three-dimensional coordinates of each of the measuring points. By displaying each of a measuring points on the wide-angle image, a progress state of the measurement, the measurement position, a measuring point which has been measured, and a measuring point which has not been measured are made clear and the duplicated measurement and the missing of the measurement can be prevented.

It is to be noted that when the narrow-angle image and the measuring point are to be superposed on the wide-angle image, the relationship between the optical axes of the light receiving module 22, the tracking module 23, and the wide-angle image pickup module 24 are already-known, and further, since the relationship is fixed, it is needless to say that the narrow-angle image and the measuring point can be superposed on the wide-angle image only with the respective angle information (the deflection angle information of the distance measuring optical axis 49) of the disk prisms 63 and 64.

In the tracking operation, if the tracking by the tracking module 23 is discontinued by the rapid movement of the object to be measured, the tracking state can be recovered based on the wide-angle image as obtained by the wide-angle image pickup module 24.

The image processing module 35 detects the object to be measured from the wide-angle image by the image processing and calculates the position of the object to be measured in the wide-angle image. The calculation result is inputted into the arithmetic control module 26.

Since the relationship between the image pickup optical axis 75 and the distance measuring optical axis 49 is already-known, the arithmetic control module 26 calculates the position of the object to be measured with respect to the reference optical axis O (the deflection angle of the distance measuring optical axis 49 with respect to the reference optical axis O) based on the position of the object to be measured in the wide-angle image. The arithmetic control module 26 controls the optical axis deflector 37 so that the distance measuring optical axis 49 becomes the deflection angle. Thus, even if the tracking is discontinued, the state can be recovered to the taking immediately.

It is to be noted that the detection of the object to be measured by the image processing module 35 may be performed when the tracking is discontinued or may be performed continuously at all times.

Subsequently, a specific example of a distance measuring and a tracking optical systems will be described by referring to FIG. 5 and FIG. 6. It is to be noted that, in FIG. 5 and FIG. 6, components equivalent to components as shown in FIG. 3 and FIG. 4 are referred by the same reference numerals, and a detailed description thereof will be omitted.

Figure 5:
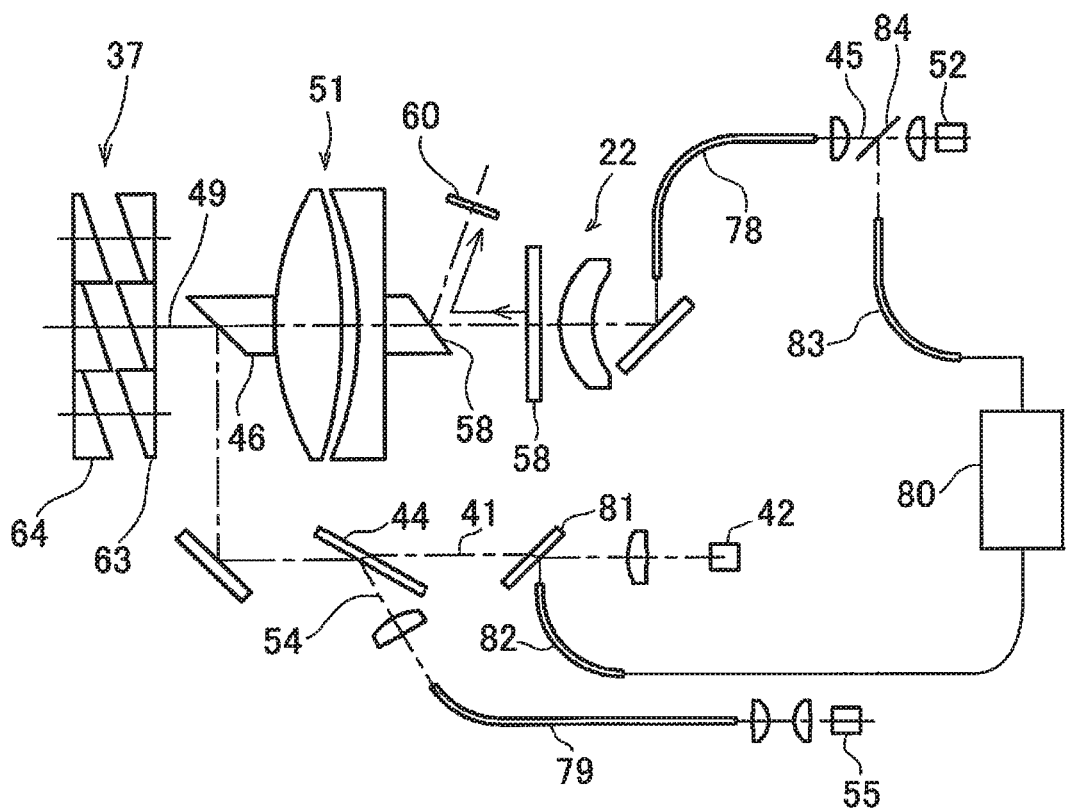
FIG. 5 is a block diagram of an essential part of an optical system of the surveying instrument.

In FIG. 5, a reflection mirror 46 is provided at a center of a lens surface on an object side of a focusing lens 51, and a beam splitter 58 is provided at a center on an image side of the focusing lens 51. Here, the beam splitter 58 has an optical characteristic that transmits only a distance measuring light and reflects only a tracking light.

A distance measuring light emitted from a light emitter 42 and a tracking light emitted from a tracking light source 55 and led by an optical fiber 79 are reflected on the same optical axis by the reflection mirror 46 and are projected through a optical axis deflector 37. A reflected distance measuring light and a reflected tracking light are incident to a light receiving module 22 through the optical axis deflector 37 and the focusing lens 51, and the reflected tracking light is reflected by beam splitters 58 and 58 and is incident to a tracking photodetector 60.

The reflected distance measuring light transmitting through the beam splitters 58 and 58 is led by an optical fiber 78 to a photodetector 52.

Further, in FIG. 5, reference numeral 80 denotes an internal reference optical system and a part of the distance measuring light is divided by a beam splitter 81 as provided on the projection optical axis 41 and is led as an internal reference light by an optical fiber 82 to the internal reference optical system 80. Further, the internal reference light is made to enter the photodetector 52 by an optical fiber 83 and a beam splitter 84 as provided on the light receiving optical axis 45.

The photodetector 52 receives the reflected distance measuring light and the internal reference light and produces light receiving signals, respectively. A distance measurement calculating module 25 (see FIG. 3) calculates a distance to the object to be measured based on light receiving timings of the reflected distance measuring light and the internal reference light.

In the specific example illustrated in FIG. 5, a distance measuring light and a tracking light have different wavelengths, and the distance measuring light and the tracking light are separated by a beam splitter 58.

As is well-known, an optical member has a wavelength characteristic that a refractive index is different for each wavelength when lights with different wavelengths are transmitted. Therefore, the optical axis deflector 37 configured by the triangular prisms also have the wavelength characteristic that the deflection angle is different for each wavelength.

Figure 6:
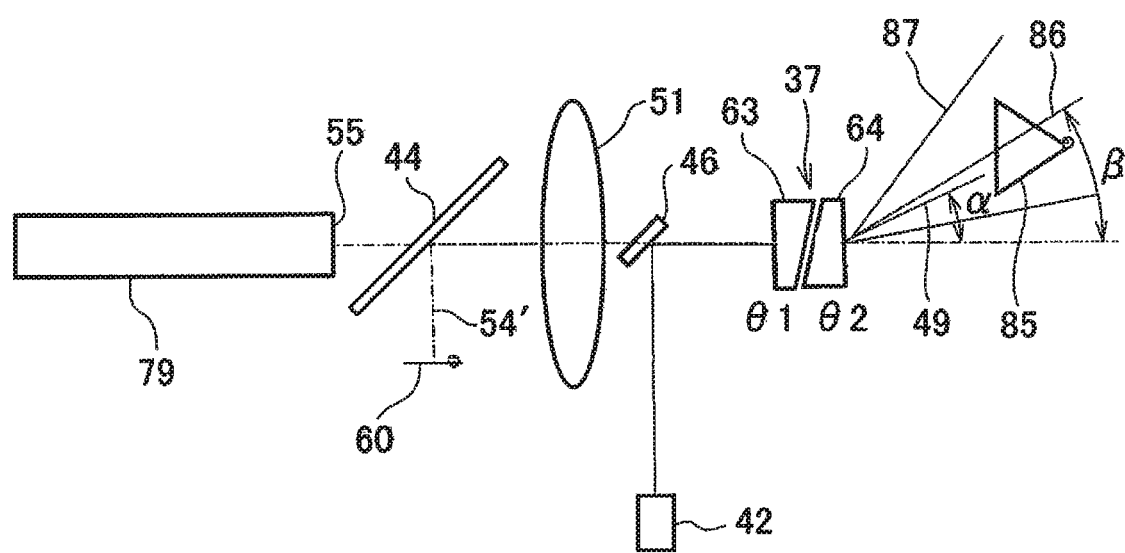
FIG. 6 is an explanatory drawing illustrating behaviors of a tracking light and a distance measuring light having different refractive indexes in the optical system.

FIG. 6 illustrates behaviors of a tracking light and a distance measuring light in a case where the refractive indexes are different.

Further, in FIG. 6, reference numeral 85 denotes a prism as an object to be measured, reference numeral 49 to an optical axis (a distance measuring optical axis) of the distance measuring light 47, and reference numeral 86 to an optical axis (a tracking optical axis) of the tracking light 87.

The tracking light is made uniform by passing through the optical fiber 79 (multi-mode fiber) and is projected from a projection end surface of the optical fiber 79 as a secondary light source. The projection end surface of the optical fiber 79 has a predetermined area. Therefore, the tracking light has a predetermined spread.

The tracking light and the distance measuring light pass through the optical axis deflector 37 and are deflected by refraction actions of the disk prisms 63 and 64. On the other hand, since the tracking light and the distance measuring light have different wavelengths, the refraction actions to the tracking light and the distance measuring light are different respectively, and the deflection angles of the tracking light and the distance measuring light are also different. As illustrated, for instance, a deflection angle of α appears in the distance measuring light, and a deflection angle of β appears in the tracking light (α<β). Therefore, a deviation occurs between the distance measuring optical axis and the tracking optical axis by a deflection angle difference of (β−α).

It is to be noted that the spread of the tracking light is set as a maximum deviation or more between the distance measuring optical axis and the tracking optical axis caused by the optical characteristic of the optical axis deflector 37 and is set so that the object to be measured is included within a light flux of the tracking light in a state where the distance measuring optical axis 49 is directed toward the object to be measured.

Further, in a case where the distance measuring light is reflected by the prism 85, the reflected distance measuring light is deflected to the distance measuring optical axis by the optical axis deflector 37. On the other hand, the tracking light is incident to the prism 85 with a deviation only by an angle of (β−α) with respect to the distance measuring light and is reflected, and hence, the reflected tracking light becomes an out-of-axis light out of the optical axis of the distance measuring light.

Further, when the reflected distance measuring light and the reflected tracking light transmits through the optical axis deflector 37, the reflected distance measuring light and the reflected tracking light are subjected to the refraction action by the disk prisms 63 and 64, but the optical axis of the reflected distance measuring light is deviated from the distance measuring optical axis, and the state where the reflected tracking light is the out-of-axis light is not changed. The light receiving position of the reflected tracking light on the tracking photodetector 60 is a position deviated from the center of the tracking photodetector 60 (a position deviated from the tracking light receiving optical axis 54' (see FIG. 3) only by the deflection angle difference of (β−α)), that is, a position deviated from the position where the reflected distance measuring light is received.

Since the tracking is performed based on the tracking control information created based on the light receiving position of the reflected tracking light on the tracking photodetector 60, if there is a deviation between the light receiving position of the reflected tracking light and the light receiving positron of the reflected distance measuring light, the accurate tracking cannot be performed.

As described above, the deflection angle difference between the optical axes of the distance measuring light and the tracking light caused by the disk prisms 63 and 64 appears as deviation of the light receiving positions between the reflected distance measuring light and the reflected tracking light on the tracking photodetector 60 (since the light receiving optical axis 45 and the tracking light receiving optical axis 54' are substantially coaxial, a deviation with respect to the tracking light receiving optical axis 54'). Therefore, the deflection angle difference caused by the difference of the wavelengths can be corrected by making a correction for offsetting the deviation of the light receiving positions between the reflected distance measuring light and the reflected tracking light on the tracking photodetector 60, that is, on the image.

With regard to the correction of the deflection angle difference, for instance, the deviation of the light receiving position of the reflected tracking light on the tracking photodetector 60 includes a deviation of the distance measuring optical axis 49 from the object to be measured and a shift caused by the optical characteristic of the optical axis deflector 37 in a state where the tracking is being performed. Therefore, a deviation, which is obtained by subtracting the deviation caused by the optical characteristic of the optical axis deflector 37 from the actual deviation of the light receiving position of the reflected tracking light on the tracking photodetector 60, is a deviation of the optical axis for which the direction of the distance measuring optical axis 49 needs to be corrected.

Therefore, the tracking calculating module 61 calculates a deviation, as caused by the optical characteristic of the optical axis deflector 37, based on the refractive indexes of the triangular prisms 65a, 65b, and 65c and the rotation positions of the disk prisms 63 and 64, and further, calculates the light receiving position (a virtual reference point) when there is no deviation as caused by the optical characteristic of the optical axis deflector 37 based on the calculation result. The tracking calculating module 61 obtains a deviation (a corrected deviation) between the virtual reference point and the light receiving position of the actual reflected tracking light, and performs tracking based on the corrected deviation.

The tracking calculating module 61 makes the information for correcting the deflection angle difference due to the difference of the wavelengths to be included in the tracking control information and outputs the information to the arithmetic control module 26.

In the present embodiment, when a deflection is performed by the optical axis deflector 37, the deflection angle difference between the distance measuring light and the tracking light or the deviation between the distance measuring light and the tracking light on the tracking photodetector 60 is acquired in advance and held as the table data. The tracking calculating module 61 corrects the tracking control information based on the deflection angle difference between the distance measuring light and the tracking light or the deviation of the light receiving position, and performs tracking based on the accurate tracking control information in which the deflection angle difference between the distance measuring light and the tracking light or the deviation of the light receiving position is offset.

Figure 7:
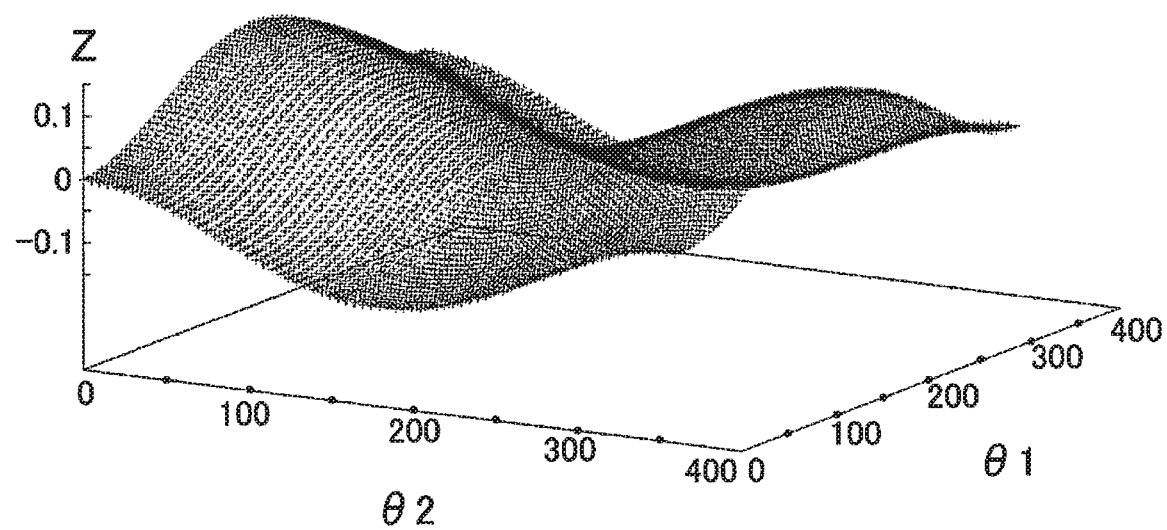
FIG. 7 is a diagram illustrating a relationship between a deflection angle and a deflection angle difference between fluxes with different wavelengths deflected by the optical axis deflector in the embodiment.

FIG. 7 illustrates an example of the table data.

Reference character θ1 in FIG. 7 denotes a rotation angle of the disk prism 63 from the reference position, reference character θ2 denotes a rotation angle of the disk prism 64 from the reference position, and a Z-axis indicates a deflection angle difference corresponding to θ1 and θ2.

It is to be noted that the deflection angle difference is different depending on the wavelength of the distance measuring light in use, the wavelength of the tracking light, and the refractive indexes of the disk prisms 63 and 64 in use, and the table data is created corresponding to the wavelength of the distance measuring light, the wavelength of the tracking light, and the disk prisms 63 and 64 in use.

The tracking photodetector 60 also receives the background light other than the tracking reflected light but since only the background light with the same wavelength as the tracking light in the background light is reflected by the beam splitter 58, the light received by the tracking photodetector 60 is only the background light with the same wavelength as the tracking light. Therefore, an image obtained by the background light is a solid-color image. It is to be noted that with regard to the solid-color image, too, the deflection angle difference can be corrected similarly to the tracking light.

Subsequently, assuming that the optical characteristic of the beam splitter 58 is such that only the distance measuring light is transmitted and the light beams with the wavelength other than the distance measuring light is reflected, the background light incident to the tracking photodetector 60 becomes the natural light, and an image obtained by the tracking photodetector 60 becomes an RBG color image.

Since the RBC light beam composes of light beams with different wavelengths, respectively, the refraction actions by the disk prisms 63 and 64 are different, and the deflection angle difference is generated among the light beams. Thus, a deviation for a deflection angle difference portion is generated among an image of the R light beam, an image of the B light beam, and an image of the G light beam.

In the present invention, the data table on the relationship between the deflection angle and the deflection angle difference is created for each of the R light beam, the B light beam, and the G light beam, the correction information is created for each of the R light beam, the B light beam, and the G light beam, and by having the correction information included in the tracking control information, the angle deviation is corrected on the image in real time, and the deviation between the imaged caused by the wavelength difference is solved.

Thus, even if the surveying instrument 3 is rotated during the tracking operation or the like, a clear color image can be acquired.

Further, when an image acquired by the tracking module 23 is superposed on the wide-angle image acquired by the wide-angle image pickup module 24, too, a tone of color, a hue and the like become the same as those of the wide-angle image, and a quality of a synthesized image is improved.

It is to be noted that when the distance measuring light and the tracking light with the same wavelength are used, a deflection angle difference between the distance measuring light and the tracking light when being transmitted through the optical axis deflector 37 is not generated, and there is no need to correct the tracking control information.

In the aforementioned embodiment, the case where the surveying instrument 3 is fixed to the tripod 2 is described, but the surveying instrument 3 single body may be held and carried by the operator, and the measuring point can be measured.

In a state carried by the operator, an attitude of the surveying instrument 3 is unstable, and the distance measuring optical axis 49 directed toward the measuring point is also shaken, but since the distance measuring optical axis 49 is deflected by the optical axis deflector 37 at a high speed, and the measuring point can be tracked, the distance measuring optical axis 49 can be accurately directed to the measuring point even in the hand-shake state, and highly accurate measurement can be performed. It is to be noted that it is needless to say that the attitude (the tilt) of the surveying instrument 3 is detected by the attitude detector 28 in real time.

Further, even in a state where the operator carries the surveying instrument 3, the tracking of the object to be measured can be performed.

Further, in the aforementioned description, the surveying instrument 3 is described as a total station, but by rotating the disk prisms 63 and 64 of the optical axis deflector 37 continuously, respectively, and further, by controlling the rotation speed and the rotating direction individually, respectively, the distance measuring optical axis 49 can be made to scan with an arbitrary pattern and furthermore, by performing the distance measurement for each pulsed light, the point cloud data can be obtained along a scan line, and the surveying instrument 3 can be used also as a laser scanner.

The invention claimed is:

1. A surveying instrument comprising: a distance measuring light projecting module for projecting a distance measuring light, a light receiving module for receiving a reflected distance measuring light which is said distance measuring light retro-reflected by an object to be measured and a background light incident coaxially with the reflected distance measuring light, a distance measuring unit for receiving the reflected distance measuring light and performing a distance measurement, an image pickup module for receiving the background light separated from the reflected distance measuring light and acquiring a background image, an optical axis deflector for integrally deflecting an optical axis of the distance measuring light and an optical axis of the background light, and an arithmetic control module for controlling said optical axis deflector, wherein the optical axis deflector has a pair of disk prisms in which two or more prism columns are arrayed in parallel, a rotary driving module for rotating said disk prisms individually, and a projecting direction detecting module for detecting a rotation angle of each of said disk prisms, wherein a wavelength of the distance measuring light and a wavelength of the background light are different, and said arithmetic control module is configured to correct an optical axis deviation with respect to a distance measuring optical axis caused by a wavelength characteristic that a refractive index is different for each wavelength in said optical axis deflector on an image acquired by said image pickup module based on the wavelength characteristic and a detection result of said projecting direction detecting module.

2. The surveying instrument according to claim 1, further comprising a wide-angle image pickup module for acquiring a wide-angle image, wherein an optical axis of the wide-angle image pickup module is in parallel with said distance measuring optical axis and has an already-known relationship, and the arithmetic control module indicates a measuring position of a measuring point on the wide-angle image based on a deflection angle of the distance measuring optical axis by said optical axis deflector when measuring the measuring point.

3. A surveying instrument system comprising: the surveying instrument according to claim 2, a supporting unit for installing the surveying instrument, and an installment base unit which is a support portion of said surveying instrument, wherein said installment base unit has a rotary driving module which rotates/drives said surveying instrument in a horizontal direction and in a vertical direction, and an angle detector which detects a horizontal rotation angle and a vertical rotation angle, and said arithmetic control module is configured to control a rotary driving module of said optical axis deflector and to perform a tracking of an object to be measured and is configured to control said rotary driving module of said installment base unit and said rotary driving module of said optical axis deflector such that a deflection angle of the distance measuring optical axis becomes 0.

4. The surveying instrument according to claim 1, further comprising a tracking module for irradiating a tracking light with the same optical axis as said distance measuring light, receiving a reflected tracking light from the object to be measured and performing the tracking, wherein the background light includes a wavelength of the tracking light, and said image pickup module and the tracking module are both used at the same time.

5. A surveying instrument system comprising: the surveying instrument according to claim 4, a supporting unit for installing the surveying instrument, and an installment base unit which is a support portion of said surveying instrument, wherein said installment base unit has a rotary driving module which rotates/drives said surveying instrument in a horizontal direction and in a vertical direction, and an angle detector which detects a horizontal rotation angle and a vertical rotation angle, and said arithmetic control module is configured to control a rotary driving module of said optical axis deflector and to perform a tracking of an object to be measured and is configured to control said rotary driving module of said installment base unit and said rotary driving module of said optical axis deflector such that a deflection angle of the distance measuring optical axis becomes 0.

6. The surveying instrument according to claim 1, wherein an optical component, which separates the background light from said reflected distance measuring light, separates a wavelength other than the reflected distance measuring light, the background image acquired by the image pickup module is an RGB color image, and an image deviation of the RGB is corrected based on the control information of said optical axis deflector.

7. A surveying instrument system comprising: the surveying instrument according to claim 6, a supporting unit for installing the surveying instrument, and an installment base unit which is a support portion of said surveying instrument, wherein said installment base unit has a rotary driving module which rotates/drives said surveying instrument in a horizontal direction and in a vertical direction, and an angle detector which detects a horizontal rotation angle and a vertical rotation angle, and said arithmetic control module is configured to control a rotary driving module of said optical axis deflector and to perform a tracking of an object to be measured and is configured to control said rotary driving module of said installment base unit and said rotary driving module of said optical axis deflector such that a deflection angle of the distance measuring optical axis becomes 0.

8. A surveying instrument system comprising: the surveying instrument according to claim 1, a supporting unit for installing the surveying instrument, and an installment base unit which is a support portion of said surveying instrument, wherein said installment base unit has a rotary driving module which rotates/drives said surveying instrument in a horizontal direction and in a vertical direction, and an angle detector which detects a horizontal rotation angle and a vertical rotation angle, and said arithmetic control module is configured to control a rotary driving module of said optical axis deflector and to perform a tracking of an object to be measured and is configured to control said rotary driving module of said installment base unit and said rotary driving module of said optical axis deflector such that a deflection angle of the distance measuring optical axis becomes 0.

9. A measuring instrument comprising: a distance measuring light projecting module for projecting a distance measuring light, a light receiving module for receiving a reflected distance measuring light, which is the distance measuring light retro-reflected by an object to be measured, and a reflected tracking light incident coaxially with the reflected distance measuring light, a distance measuring unit for receiving the reflected distance measuring light and performing a distance measurement, a tracking module for projecting a tracking light with the same optical axis as a distance measuring optical axis, for receiving the reflected tracking light separated from the reflected distance measuring light, for detecting a deviation between the reflected tracking light and said distance measuring optical axis, for calculating the tracking control information based on the deviation and for performing the tracking, an optical axis deflector for integrally deflecting the distance measuring light and the tracking light, and an arithmetic control module for controlling said optical axis deflector and for directing the distance measuring optical axis toward the object to be measured and performing a measurement, wherein said optical axis deflector has a pair of disk prisms in which two or more prism columns is arrayed in parallel, a rotary driving module for rotating said disk prisms individually, and a projecting direction detecting module for detecting a rotation angle of each of said disk prisms, wherein the tracking control information includes a detection result of said projecting direction detecting module, and said optical axis deflector is configured to be controlled based on the tracking control information, wherein a wavelength of said distance measuring light and a wavelength of the tracking light are different, and said arithmetic control module is configured to correct an optical axis deviation with respect to said distance measuring optical axis caused by a wavelength characteristic of said optical axis deflector on an image acquired by said tracking module based on the wavelength characteristic and a detection result of said projecting direction detecting module and to perform a tracking based on a correction result.

10. The surveying instrument according to claim 9, wherein the tracking light has a spread larger than a maximum optical axis deviation with respect to said distance measuring optical axis caused by the wavelength characteristic of said optical axis deflector.

11. A surveying instrument system comprising: the surveying instrument according to claim 10, a supporting unit for installing the surveying instrument, and an installment base unit which is a support portion of said surveying instrument, wherein said installment base unit has a rotary driving module which rotates/drives said surveying instrument in a horizontal direction and in a vertical direction, and an angle detector which detects a horizontal rotation angle and a vertical rotation angle, and said arithmetic control module is configured to control a rotary driving module of said optical axis deflector and to perform a tracking of an object to be measured and is configured to control said rotary driving module of said installment base unit and said rotary driving module of said optical axis deflector such that a deflection angle of the distance measuring optical axis becomes 0.

12. A surveying instrument system comprising: the surveying instrument according to claim 9, a supporting unit for installing the surveying instrument, and an installment base unit which is a support portion of said surveying instrument, wherein said installment base unit has a rotary driving module which rotates/drives said surveying instrument in a horizontal direction and in a vertical direction, and an angle detector which detects a horizontal rotation angle and a vertical rotation angle, and said arithmetic control module is configured to control a rotary driving module of said optical axis deflector and to perform a tracking of an object to be measured and is configured to control said rotary driving module of said installment base unit and said rotary driving module of said optical axis deflector such that a deflection angle of the distance measuring optical axis becomes 0.

* * * * *